United States Patent [19]

Sheldon et al.

[11] 3,958,599

[45] May 25, 1976

[54] REMOTE SENSING REGULATOR AND SHUTOFF VALVE FOR VALVE MANIFOLDS

[75] Inventors: Robert S. Sheldon; David E. Whitten, both of Northridge, Calif.

[73] Assignee: Air-Dry Corporation, Northridge, Calif.

[22] Filed: Aug. 29, 1974

[21] Appl. No.: 501,785

[52] U.S. Cl............................ 137/613; 137/505.22; 137/505.23; 137/614.17; 137/637.2
[51] Int. Cl.².......................................... F16K 11/10
[58] Field of Search................. 137/614.16, 614.17, 137/637.2, 637.3, 637.4, 637.5, 613, 505.22, 505.23, 505, 505.12, 484.2, 484.4, 484.6

[56] References Cited
UNITED STATES PATENTS

| | | | |
|---|---|---|---|
| 2,245,210 | 6/1941 | McElwaine | 137/505.23 |
| 3,665,959 | 5/1972 | Castillon | 137/505.22 |

Primary Examiner—William R. Cline
Assistant Examiner—H. Jay Spiegel
Attorney, Agent, or Firm—Robert C. Comstock

[57] ABSTRACT

A remote sensing regulator and shutoff valve for valve manifold applications. The manifold includes a pressure regulator and a shutoff valve downstream from the regulator. The sensing pressure input of the regulator is connected to a negative pressure area of the shutoff valve so that the output pressure of the regulator is increased to compensate for pressure drops both upstream and downstream from the shutoff valve. The shutoff valve includes a control knob for adjusting the reference pressure and for shutting off the reference pressure simultaneously with shutting off the main stream through the shutoff valve.

5 Claims, 4 Drawing Figures

REMOTE SENSING REGULATOR AND SHUTOFF VALVE FOR VALVE MANIFOLDS

BACKGROUND OF THE INVENTION

1. Field of the Invention

The invention relates to a remote sensing regulator and shutoff valve for valve manifolds.

2. Description of the Prior Art

In direct acting regulators of the type now in use, there are a number of causes of pressure loss which result in improper pressure regulation. These include pressure drops which occur in passages and/or valving and reference spring rate changes. If the pressure is sensed or regulated at the pressure regulator output before these errors occur, the pressure at the output point will be less than desired. As pressure and flow increase, these errors also increase.

In manifolds, there are pressure drops between the regulator output and the shutoff valve and there are also additional pressure losses occurring downstream from the shutoff valve between the shutoff valve output and the manifold output. There are presently no devices in which it is possible to provide automatic compensation for such pressure drops.

In existing devices, it is also necessary to shut off the regulator sensing pressure separately from closing the shutoff valve.

There is also at the present time no remote sensing regulator in which the reference pressure can be accurately controlled. In a manifold system, it is necessary to have pinpoint adjustment, since it is necessary to compensate for small discrepancies and variations such as machine tolerances.

SUMMARY OF THE INVENTION

The primary object of the invention is to provide a remote sensing regulator and shutoff valve for valve manifolds which provides automatic and accurate compensation for pressure drops in the system, including pressure drops both upstream and downstream from the shutoff valve.

A more particular object of the invention is to provide such a structure in which a reference pressure is fed back to the pressure regulator from a negative or reduced pressure area of the shutoff valve in order to compensate for pressure losses downstream from the shutoff valve as well as those upstream from the shutoff valve.

A further object of the invention is to provide such a structure in which the shutoff valve includes means for accurate control and adjustment of the sensing pressure.

In many valve manifold applications, pressure regulation requirements are critical. The regulator pressure sensing element may also be subjected to high pressure.

Another object of the invention is to provide a structure in which it is possible to shut off the regulator remote sensing pressure simultaneously with closing the manual downstream shutoff valve. This feature is convenient for removal of the regulator for maintenance in a valve manifold system.

If the system remains pressurized by some alternate means when the regulator is removed for maintenance, this remote pressure sensing part must be closed. The regulator cannot be removed until the outlet shutoff valve is closed; therefore, it is desirable to automatically close the sensing line when closing the outlet shutoff valve.

Combining these features into a manual shutoff valve is so effective that a near zero regulator error performance was effected in prototype hardware.

In existing devices, the higher the flow, the greater the difference between the sensed and regulated pressures. It is an object of the invention to provide a device and arrangement which effectively compensates for these higher errors and losses.

A further object of the invention is to provide a structure and arrangement in which large regulator diaphragms, passages and outlet valves are eliminated, so that smaller and more economical components can be used even with higher pressure.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE PREFERRED EMBODIMENT

Figure 1:
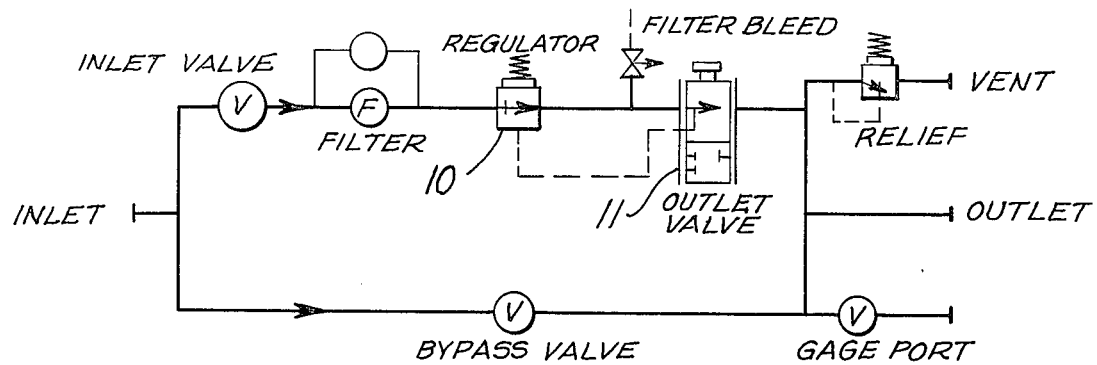
FIG. 1 is a schematic view of the invention in use in a valve manifold assembly.
Figure 2:
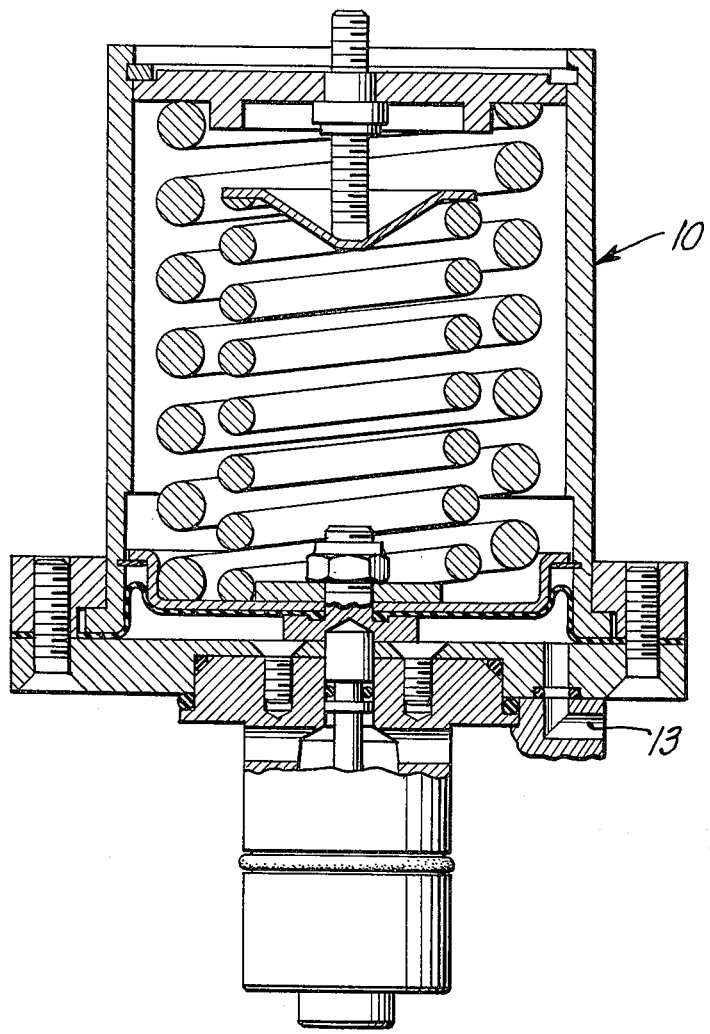
FIG. 2 is a longitudinal sectional view of the regulator.
Figure 3:
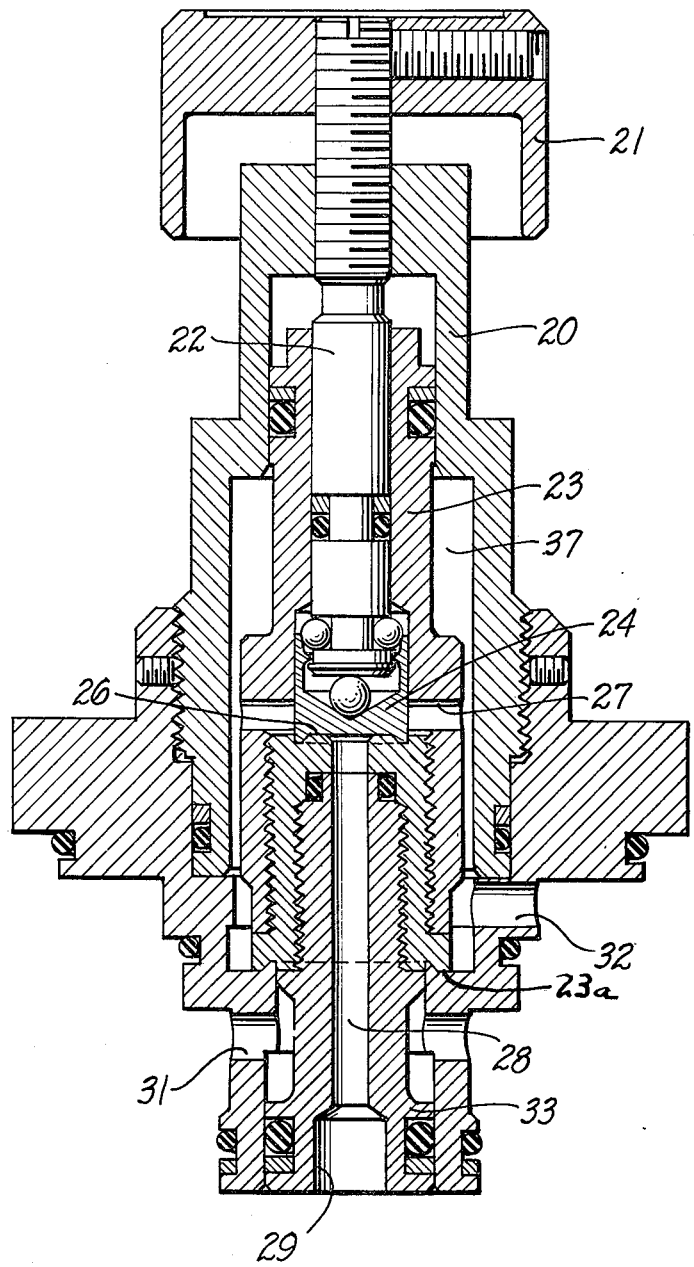
FIG. 3 is a longitudinal sectional view of the shutoff valve assembly in fully closed position.

Referring to FIG. 1 of the drawings, this is a schematic diagram showing a pressure regulating manifold which incorporates the subject matter of the present invention. The system includes a regulator 10, which is also shown in FIG. 2 of the drawings, and an outlet or shutoff valve 11, which is also shown in FIG. 3 of the drawings. The dotted line which extends from the shutoff valve 11 to the regulator 10 represents the sensing pressure which is fed back from the shutoff valve 11 to the regulator 10 in order to adjust the regulator output pressure.

Referring to FIG. 2 of the drawings, the regulator 10 may be of any conventional type or structure in which the pressure from the output is controlled by the sensing pressure at the input 13, which is fed back from the shutoff valve 11. The structure and operation of the pressure regulator are conventional and well-known to those skilled in the art and accordingly need not be described herein.

Figure 4:
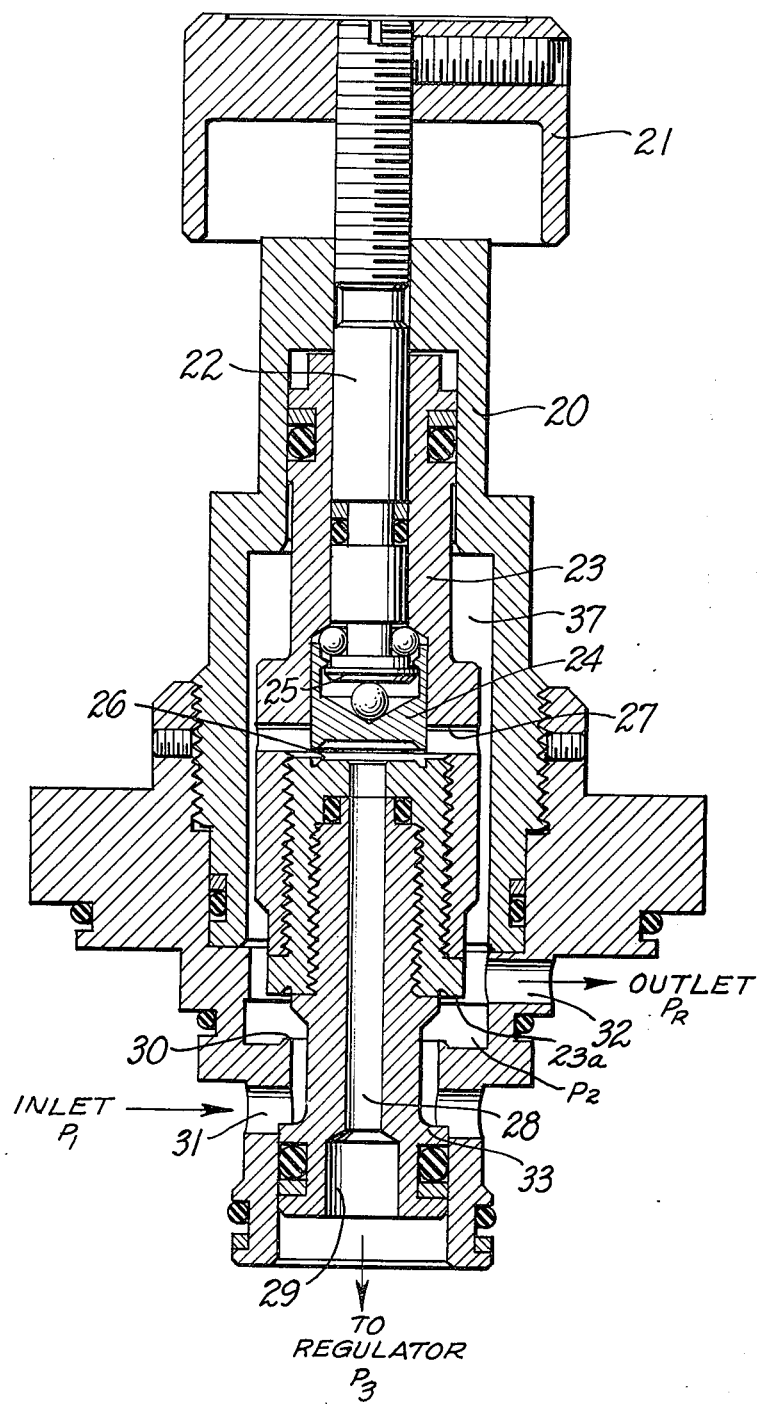
FIG. 4 is a similar view of the shutoff valve assembly in fully open position.

Referring to FIGS. 3 and 4 of the drawings, the shutoff valve 11 includes a valve body 20. A manually operable control knob 21 is mounted on the top of a shaft 22, the upper portion of which is threadedly mounted in the upper end of the body 20. The lower portion of the shaft 22 extends into a main poppet 23 along its longitudinal axis.

The lower end of the shaft 22 carries a pressure sensing poppet 24 which is mounted within an enlarged opening in the main poppet 23 and which is normally urged downwardly by a spring 25. The bottom of the pressure sensing poppet 24 is adapted to engage a poppet seat 26 formed adjacent the mid-portion of the main poppet 23 when the shutoff valve 11 is closed.

Openings 27 extend through the midportion of the main poppet 23 above the poppet seat 26, connecting with a regulator pressure sensing chamber 37 within which the main poppet 23 is mounted for reciprocal vertical movement.

A passage 28 extends through the longitudinal axis of the main poppet 23 from the poppet seat 26 to an outlet 29 at the bottom of FIG. 3 which is connected to and comprises the sensing pressure ($P_3$) which is fed back to the regulator 10.

The lower portion of the main poppet 23 carries a main valve closure member 23a which is adapted to engage a main valve seat 30 formed on the valve body 12 when the shutoff valve is closed. Inlet pressure ($P_1$) is fed into the shutoff valve 11 through one or more inlets 31 disposed beneath the main valve seat 30.

The regulated outlet pressure ($P_R$) flows out through a plurality of spaced milled slots 32 formed in the valve body 20 above the main valve seat 30.

It should be noted that the lower end 33 of the main poppet 23 is somewhat larger in diameter than the inner diameter of the main valve seat 30. This means that the main poppet 23 is pressure unbalanced towards closed position.

The main poppet 23 and pressure sensing poppet 24 are both normally disposed in open position when the valve is in use. The inlet pressure ($P_1$) which comprises the output from the regulator 10 enters the inlet 31 and flows through the space between the main poppet 23 and the main valve seat 26. From this point, there is pressure flow around the lower corner of the valve closure member 23a through the milled slots 32 to provide the regulated output pressure ($P_R$).

There is also pressure flow ($P_3$) upwardly alongside the main poppet 23 into the openings 27, past the poppet seat 26, into the passage 28 and out through the outlet 29. From the outlet 29, the pressure ($P_3$) flows to the regulator 10 as the sensing pressure.

One of the essential features of the invention is that the pressure ($P_3$) which is fed back to the regulator is lower than the outlet pressure ($P_R$). This is due to the fact that the feedback pressure ($P_3$) is taken from a negative or reduced pressure area. The high velocity fluid passing over a static corner between the main valve closure member and the adjacent portions of the valve body 20 produces a low or reduced pressure area. This is due to fluid entrailment as the flow passes through a narrow passage. It is well-known that a jet stream passing through a reduced orifice produces a negative pressure. This pressure is sensed in the relieved area extending alongside the main poppet 23 transversely to the main pressure flow.

As a result, the regulator 10 is fed back a sensing pressure ($P_3$) which is actually less than the outlet pressure ($P_R$). Since the pressure appears to be too low, the regulator will increase its outlet pressure to an amount and degree precisely necessary to overcome the spring rate droop and pressure drops in the entire system, including those upstream from the shutoff valve and those downstream as well. The manifold outlet pressure is thereby controlled to exactly the pressure desired and not the desired pressure less the pressure drops.

Another important feature of the invention is that the amount of reduced or negative pressure which is fed to the regulator can be easily and accurately adjusted and controlled by changing the distance of separation between the main valve closure member 23a and the adjacent portion of the valve body 11 beneath the windows 32. This is done by rotating the control knob 21, which raises or lowers the main poppet 23 and its valve closure member 23a. The pressure unbalance described above acts like a spring in normally urging the main poppet 23 downwardly, so that the vertical position of the main poppet 23 is directly responsive to rotation of the control knob 21.

In opening the shutoff valve 11, the control knob 21 is rotated toward open position and the incoming pressure first pulls the pressure sensing poppet 24 off its seat 26, opening a flow path for the sensing pressure $P_3$ to flow to the pressure regulator 10. Further opening of the control knob 21 bottoms the pressure sensing poppet 24 on its seat 26 and pulls the main valve closure member 23a off the main valve seat 30, opening the main output flow path 32 for the regulated outlet pressure ($P_R$).

The closing sequence is reversed, with the pressure sensing poppet 24 being closed first to close the regulator pressure sensing outlet and the main flow path being closed thereafter.

A typical example of the operation of the invention is set forth in the tabulated values below:

| Flow SCFM | Desired: 8/5 PSIG Regulation Pressure (PSIG) | | | |
|---|---|---|---|---|
| | P1 | P2 | P3 | PR |
| 0 | 8 | 8 | 8 | 8 |
| 84 | 58 | 15 | 5 | 7 |

As the flow increases from lock-up to fully open, the supply pressure from the regulator ($P_1$) increases from 8 to 58 P.S.I.G., taking a major pressure drop across the main shutoff valve seat, diminishing to approximately 15 P.S.I.G. The outlet pressure $P_R$ is 7 P.S.I.G., but the negative pressure fed back to the regulator ($P_3$) is only 5 P.S.I.G. It is important that the feedback pressure $P_3$ be less than the outlet pressure $P_R$, since otherwise the outlet pressure $P_R$ will be higher than desired.

The essential novelty of the invention resides in feeding back a negative sensing pressure $P_3$ to the regulator in order to compensate for pressure drops and spring rate changes which are not compensated for by merely feeding back the outlet pressure $P_R$.

The vertical position of the main poppet 23 is adjusted by the control knob 21 to obtain the desired negative pressure $P_3$ which controls the output of the regulator 10. The negative pressure $P_3$ is proportional to the flow rate. Its negative value is zero at no flow and increases to maximum at full flow. The shutoff valve 11 is sized and adjusted so that the negative value of the reference pressure $P_3$ is proportional to the manifold and shutoff valve regulator spring rates and other pressure drops.

It should be noted that the sensing element of the pressure regulator is not subjected to high pressure. There may be high intermediate pressures in the system, but they are not sensed by the regulator. It is accordingly possible to use smaller and more economical components in the manifold system.

We claim:

1. In a valve manifold assembly which includes a pressure regulator having an input, an output and a pressure sensing chamber, said assembly also including a shutoff valve having an inlet connected to the output of said regulator, said shutoff valve having a valve closure member movably mounted within a valve body, said valve closure member being movable to an open position to permit flow from said regulator outlet into and through said shutoff valve, the opening between said valve closure member and adjacent portions of said valve body forming a restricted area which causes turbulence so that the pressure within said restricted area is reduced to an amount less than the output pressure of said shutoff valve, said shutoff valve having a sensing pressure outlet, passage means in said shutoff valve connecting said restricted area to said sensing pressure outlet, and means connecting said sensing pressure outlet to said sensing chamber of said pressure regulator, so that the pressure sensed by said regulator is the reduced pressure of said restricted area, which is less than the outlet pressure of said shutoff valve, thereby causing an increase in the output pressure of said regulator above the amount which would normally be provided in response to sensing the output pressure of said shutoff valve, to provide pressure compensation over and above the amount required to compensate for pressure drops between said regulator and said shutoff valve and thereby provide additional pressure compensation for reference spring rate changes and for pressure drops downstream from said shutoff valve which are not reflected by the output pressure of said shutoff valve, whereby said pressure regulating means provides compensation for substantially all of the pressure losses both upstream and downstream from the shutoff valve.

2. The structure described in claim 1, said shutoff valve having means for controlling the amount of pressure reduction to be supplied to the sensing chamber of said pressure regulator by changing the distance of separation between said valve control member and adjacent portions of said valve body.

3. The structure described in claim 2, said shutoff valve having a control knob rotatably mounted thereon, said control knob being connected to said valve control member and being manually operable to control the amount of separation between said valve control member and adjacent portions of said valve body when said valve control member is in open position.

4. The structure described in claim 3, and means in said shutoff valve for shutting off said regulator sensing pressure substantially simultaneously with shutting off the output of said shutoff valve.

5. The structure described in claim 4, said shutoff valve having a main poppet, a control knob for opening and closing said main poppet, and a pressure sensing poppet mounted on said main poppet, said pressure sensing poppet being opened and closed substantially simultaneously with said main poppet through the operation of said control knob.

* * * * *